United States Patent
Woodgate et al.

(10) Patent No.: US 7,466,485 B2
(45) Date of Patent: Dec. 16, 2008

(54) SWITCHABLE DISPLAY APPARATUS

(75) Inventors: Graham John Woodgate, Oxfordshire (GB); Jonathan Harrold, Warwickshire (GB)

(73) Assignee: Au Optronics Corp., Hsinchu (TW)

( * ) Notice: Subject to any disclaimer, the term of this patent is extended or adjusted under 35 U.S.C. 154(b) by 2 days.

(21) Appl. No.: 10/544,257

(22) PCT Filed: Feb. 4, 2004

(86) PCT No.: PCT/GB2004/000366

§ 371 (c)(1),
(2), (4) Date: Sep. 16, 2005

(87) PCT Pub. No.: WO2004/070451

PCT Pub. Date: Aug. 19, 2004

(65) Prior Publication Data

US 2006/0098285 A1    May 11, 2006

(30) Foreign Application Priority Data

Feb. 5, 2003  (GB) ................ 0302659.8
Jul. 10, 2003  (GB) ................ 0316223.7

(51) Int. Cl.
*G02B 27/28* (2006.01)

(52) U.S. Cl. .............. 359/494; 359/497; 359/463; 348/42; 348/752

(58) Field of Classification Search ............ 348/752
See application file for complete search history.

(56) References Cited

U.S. PATENT DOCUMENTS

| 5,175,651 A |  | 12/1992 | Marron et al. |
| 5,537,256 A | * | 7/1996 | Fergason ............... 359/495 |
| 5,666,174 A | * | 9/1997 | Cupolo, III ............ 349/64 |
| 5,671,034 A | * | 9/1997 | May et al. ............. 349/200 |

(Continued)

FOREIGN PATENT DOCUMENTS

DE    100 25 226    11/2001

(Continued)

OTHER PUBLICATIONS

Commander, et al., "Electrode Designs for Tunable Microlenses," Microlens Arrays, EOS Topical Meeting, May 1997, National Physical Laboratories, pp. 48-53.

(Continued)

*Primary Examiner*—Arnel C. Lavarias
*Assistant Examiner*—Lee Fineman
(74) *Attorney, Agent, or Firm*—Thomas, Kayden, Horstemeyer & Risley

(57) ABSTRACT

A display apparatus comprises: an emissive spatial light modulator comprising an array of pixels each arranged to output randomly polarized light; a birefringent lens positioned to receive light from the spatial light modulator arranged in a first mode of operation of the display apparatus to direct light of a first polarization component into a first directional distribution and in a second mode of operation of the display apparatus to direct light of a second polarization component into a second directional distribution different from the first directional distribution; a quarter waveplate; and a linear polarizer. The quarter waveplate is arranged between the spatial light modulator and the birefringent lens and the linear polarizer is arranged on the opposite side of the birefringent lens from the quarter waveplate.

6 Claims, 5 Drawing Sheets

U.S. PATENT DOCUMENTS 5,712,721 A * 1/1998 Large .................. 359/245
6,069,650 A    5/2000 Battersby
6,304,381 B1  10/2001 Hayashi

FOREIGN PATENT DOCUMENTS

| | | |
|---|---|---|
| EP | 1089115 | 4/2001 |
| GB | 2 171 535 | 8/1986 |
| JP | 01277203 A * | 11/1989 |
| WO | WO 98/21620 | 5/1998 |
| WO | WO 03/015424 | 2/2003 |

OTHER PUBLICATIONS

Contoret, et al., "Polarized Electroluminescence from an Anisotropic Nematic Network on a Non-Contact Photoalignment Layer," Advanced Materials, vol. 12, No. 13, Jul. 5, 2000, pp. 971-974.

* cited by examiner

SWITCHABLE DISPLAY APPARATUS

The present invention relates to an apparatus for the display of images.

Such an apparatus may be used in an autostereoscopic three dimensional display, a switchable two dimensional (2D)/three dimensional (3D) autostereoscopic display or a switchable high brightness display system. Such systems may be used in computer monitors, telecommunications handsets, digital cameras, laptop and desktop computers, games apparatuses, automotive and other mobile display applications as well as telecommunications switching applications.

Display systems which use micro-optic components in order to enhance their functionality include Liquid Crystal Display (LCD) projectors, autostereoscopic 3D displays and brightness enhancing reflective displays.

In each system, a micro-optic component such as a microlens array is aligned with at least one pixel of the spatial light modulator component. A possible system is shown in plan view in FIG. 1. A backlight 2 produces illumination 4 of an LCD input polariser 6. The light passes through a thin film transistor (TFT) substrate 8 and is incident on a pixel layer 10 comprising individually controllable phase modulating pixels 12-26. The pixels are arranged in rows and columns and comprise a pixel aperture 28 and a separating black mask 30. The light then passes through an LCD counter substrate 32 and a lens carrier substrate 36 upon which is formed a birefringent microlens array 38. The birefringent microlens array 38 comprises an isotropic lens microstructure 40 and an aligned birefringent material with an optical axis direction 42. The output of the birefringent lens then passes through a lens substrate 44 and a polarisation modifying device 46.

Each birefringent lens of the lens array is cylindrical; the lens array 38 is a lenticular screen and the geometrical axis of the lenses is out of the page. The pitch of the lenses in this example is arranged to be substantially twice the pitch of the pixels of the display such that a two view autostereoscopic display is produced.

In a first mode of operation, the polarisation modifying device 46 is configured to transmit light with a polarisation state which is parallel to the ordinary axis of the birefringent material of the microlens array. The ordinary refractive index of the material (such as a liquid crystal material) is substantially matched to the index of the isotropic microstructure 40. Thus the lenses have no optical effect and there is substantially no change to the directional distribution of the output of the display. In this mode, an observer will see all the pixels 12-26 of the display with each eye, and a 2D image will be produced.

In a second mode of operation, the polarisation modifying device 46 is configured to transmit light with a polarisation state which is parallel to the extra-ordinary axis of the birefringent microlens array. The extraordinary refractive index of the material (such as a liquid crystal material) is different to the index of the isotropic microstructure 40. Thus the lenses have an optical effect and there is a change to the directional distribution of the output of the display. This directional distribution can be set as well known in the art so as an observer correctly positioned at the front of the display will see a left image in their left eye corresponding to light from left image pixels 12,16,20,24 and in their right eye will see a right image corresponding to right image pixels 14,18,22,26. In this way, a switchable 2D to 3D autostereoscopic display can be produced.

Lens arrays are particularly suitable for autostereoscopic displays because they combine the functionalities of high efficiency, small spot size and capability of being manufactured using well known lithographic processing techniques.

It has been suggested to provide electrically switchable birefringent lenses for purposes of switching light directionally, for example to switch a display between a 2D mode of operation and a 3D mode of operation.

Electrically switchable birefringent liquid crystal microlenses are described in European Optical Society Topical Meetings Digest Series: 13, 15-16 May 1997 L. G. Commander et al "Electrode designs for tuneable microlenses" pp48-58.

In another type of switchable 2D-3D display disclosed in U.S. Pat. No. 6,069,650 and WO-98/21620, switchable microlenses comprising a lenticular screen filled with liquid crystal material are used to change the optical power of a lenticular screen.

Known organic electroluminescent displays may use reflective electrodes in front of or behind the emissive part of the pixels. The pixel aperture is divided into an emissive region and a gap region, comprising an emissive pixel aperture. The vertical aperture ratio of the emissive region may be limited for example by the required width of the gap in the row electrode. Electroluminescent displays may also employ active matrix backplanes similar to those used for LCD displays. Again the result is a reduction in the aperture ratio (emitting area/whole pixel area). Such panels are thus well suited to brightness enhancement as described in WO-03/015424. In such brightness enhancement, a microlens array is used to direct an image of the pixel to an optical pupil, or 'window' in the nominal viewing plane. In the window, the observer will see an increase of brightness proportional to the vertical aperture ratio of the panel. Out of the viewing window, an observer will see the gaps between the pixels, and the display has reduced brightness.

Emissive displays, such as inorganic and organic electroluminescent displays including polymer and small molecule organic electroluminescent displays typically produce an unpolarised optical output. However, directional distribution optical switching systems may rely on polarisation switching in order to enable a display to be reconfigured between a first mode, which may be Lambertian for example, and a second mode, which may be autostereoscopic 3D windows for example. Unpolarised displays will thus show a polarisation loss when combined with polarisation directional distribution optical switching systems.

It is known in the art to use a circular polariser to avoid reflections from these electrode layers in which the emission is substantially randomly polarised. The circular polariser serves to cancel the reflection of external light from the electrodes, and generally comprises a linear polariser and quarter waveplate. It would be desirable to apply such a circular polariser to a display apparatus having a lens which is capable of modifying the directional distribution of the output light, for example to produce a 3D autostereoscopic effect or an enhanced brightness effect. However, in the case that the lens is a birefringent lens which is used to allow switching of the modification made by the lens which operates in reliance on the polarisation of light passing through the display, it is not self-evident how to implement the circular polariser which also relies on the polarisation of the light.

In one form according to a first aspect of the present invention, there is provided a display apparatus comprising:

an emissive spatial light modulator comprising an array of pixels of organic electroluminescent material each arranged to output substantially polarised light;

a switchable polariser being switchable between a first and a second polarisation mode in which the polariser passes light of respective polarisation components; and a birefringent lens positioned to receive light from the spatial light modulator arranged to direct light of a first polarisation component into a first directional distribution and to direct light of a second polarisation component into a second directional distribution different from the first directional distribution, the birefringent lens and the switchable polariser being positioned in series.

Polarised light from the spatial light modulator passes through the switchable polariser and the birefringent lens (in either order). The mode of the polariser effectively selects light corresponding to one or other of the first polarisation component or the second polarisation component to be output from the display device. Accordingly, switching the mode of the polariser causes the light output from the display device to switch between the first and second directional distributions.

In many practical embodiments, the birefringent lens has substantially no effect on light of the second polarisation component so that the second directional distribution is the same as the directional distribution of the light input to the birefringent lens. This allows switching of the device between a mode in which the birefringent lens has no effect and a mode in which the birefringent lens modifies the directional distribution of the display device.

Thus, the first aspect of the present invention provides high optical efficiency in an emissive displays by aligning the output polarisation of a polarised emissive displays with the input polarisation state of directional distribution optical switching systems. The polarisation alignment may be achieved by means of uniaxial aligned chromophores of the emissive material in the emissive pixels of the display. The alignment direction of the major axis of the polarisation output may be set to cooperate with the alignment directions of the birefringent material in the birefringent lens.

In this way, a high efficiency emissive directional distribution optical switching display may be achieved. Such a display has additional advantages over LCD displays, for example not requiring a backlight and thus can be made thinner and lighter which can be important for mobile applications.

In another form according to the first aspect of the present invention, there is provided an optical apparatus comprising:

an emissive display light direction switching apparatus, comprising: an emissive spatial light modulator apparatus comprising an array of emitting pixel regions each with a substantially polarised optical output;

a switchable polariser being switchable between a first polarisation mode that passes light of a first polarisation component and a second polarisation mode that passes light of a second polarisation component; and a birefringent lens of a birefringence such that in operation the birefringent lens directs light of the first polarisation component substantially into a first directional distribution and light of the second polarisation component substantially into a second directional distribution different from the first directional distribution;

the switchable polariser and the birefringent lens being positioned in series and arranged such that, when input light comprising or resolvable into both the first and second polarisation components is input to the device, light output by the device is substantially of the first polarisation component and is substantially directed into the first directional distribution when the switchable polariser is set to the first polarisation mode, whereas light output by the device is substantially of the second polarisation component and is substantially directed into the second directional distribution when the polariser is set to the second polarisation mode.

Preferably, one or more of the following optional features is present.

The emissive material may be a polymer electroluminescent material or a small molecule electroluminescent material.

The substantially polarised output may be:

a linear polarisation;

substantially the same direction for all of the pixels;

achieved by uniaxially aligned chromophores; and/or aligned parallel to the geometric optical axis of the birefringent lens.

A clean-up polariser may be used. It may be positioned between the pixels of the emissive display and the other optical components. The clean-up polariser may have a transmission axis which is substantially parallel to the major axis of the output polarisation of the emissive display.

The display apparatus according to the first aspect of the present invention may include any of the features of the display apparatuses disclosed in WO-03/015424, which is incorporated herein by reference, including all the features in the claims of WO-03/015424, with the change that the display apparatus has an emissive spatial light modulator comprising an array of pixels of organic electroluminescent material each arranged to output substantially polarised light. The advantages of the display apparatuses disclosed in WO-03/015424 apply equally to the present invention.

In one form according to a second aspect of the present invention, there is provided a display apparatus comprising:

an emissive spatial light modulator comprising an array of pixels each arranged to output substantially randomly polarised light;

a birefringent lens positioned to receive light from the spatial light modulator arranged in a first mode of operation of the display apparatus to direct light of a first polarisation component into a first directional distribution and in a second mode of operation of the display apparatus to direct light of a second polarisation component into a second directional distribution different from the first directional distribution;

a quarter waveplate; and a linear polariser, wherein the quarter waveplate is arranged between the spatial light modulator and the birefringent lens and the quarter waveplate is arranged on the opposite side of the birefringent lens from the linear polariser.

The quarter waveplate and the linear polariser in combination act as a circular polariser to reduce reflections in the known manner referred to above. This effect is achieved in a display apparatus having a birefringent lens which allows the directional distribution of the output light to be modified, with the modification being switchable. It has been appreciated by the present inventors that the location of the elements of the circular polariser, namely the quarter waveplate and the linear polariser, on opposite sides of the birefringent lens still allows both proper switching of the effect of the birefringent lens and proper operation of the circular polariser in both modes of operation of the birefringent lens, notwithstanding that both effects are polarisation-dependent.

Furthermore the location of these elements achieves significant advantages as follows. Firstly, as compared to the notional possibility of arranging the circular polariser as a whole between the spatial light modulator and the birefringent lens, only the quarter waveplate is located there. As a result the distance between the spatial light modulator and the birefringent lens may be minimized. This is a significant advantage. For example in the case of the lens providing an enhanced brightness effect, the viewing freedom of the display is determined by the separation of the lens from the pixel plane and the vertical extent of the pixels of the display, so the minimization of the separation achieve by the present invention optimizes the viewing freedom of the display in the directional mode. In contrast, minimizing this distance in a standard 2D display does not improve the viewing freedom.

Another advantage relates to the losses. An unpolarised emissive display is cheaper and easier to manufacture than a polarised emissive display. However, when used in combination with an unpolarised emissive display, use of a birefringent lens to provide switchable modification of the directional distribution reduces the nominal output by 50% due to the effect of the polarisation control. Similarly, the linear polariser of a circular polariser, when used with an unpolarised emissive display without a birefringent lens, reduces the normal output by 50%. However, the arrangement of the first aspect of the present invention allows both the circular polariser and switchable birefringent lens to be implemented with a total loss of only 50%, ie the losses of the circular polariser and switchable birefringent lens in isolation do not accumulate. This is a significant advantage as it allows both features to be incorporated without a corresponding increase in the losses.

In another form according to the second aspect of the present invention, there is provided an emissive directional display comprising:

a substantially randomly polarised output emissive spatial light modulator comprising an array of pixels;

a passive birefringent lens;

a polarisation rotation apparatus;

a quarter waveplate;

a linear polariser, wherein the quarter waveplate is positioned between the array of pixels and the passive birefringent lens.

In a yet another form according to the second aspect of the present invention, there is provided an emissive directional display comprising a substantially randomly polarised output emissive spatial light modulator comprising an array of pixels;

an active birefringent lens;

a quarter waveplate;

a linear polariser, wherein the quarter waveplate is positioned between the array of pixels and the active birefringent lens.

Preferably, one or more of the following optional features is present.

The emissive material may be a polymer electroluminescent material or a small molecule electroluminescent material.

The geometric optical axis of the lens may be aligned with the pixels of the spatial light modulator.

The pixels may be arranged in rows and columns.

The birefringent lens and switching arrangement therefore in accordance with the second aspect of the present invention may include any of the features of corresponding elements of the display apparatuses disclosed in WO-03/015424, which is incorporated herein by reference, including the features in the claims of WO-03/015424.

With both aspects of the invention, the lens array may be used to modify the directional distribution of the display device, in one or both modes, to achieve a variety of different effects including, but not limited to, the provision of: a 3D autostereoscopic effect; enhanced brightness; or a multi-user display system.

Thus such devices can be used for:

an autostereoscopic display means which can conveniently provide a moving full colour 3D stereoscopic image which may be viewed by the unaided eye in one mode of operation and a full resolution 2D image in a second mode of operation;

a switchable, high brightness display system which in a first mode may exhibit substantially non-directional brightness performance and in a second mode may exhibit substantially directional brightness performance; or a multi-viewer display means which can conveniently provide one moving full colour 2D images to one observer and at least a second different 2D image to at least a second observer in one mode of operation and a full resolution 2D image seen by all observers in a second mode of operation.

Advantageously, by applying the enhanced brightness performance to an organic electroluminescent display the lifetime of the display can be extended. The brightness enhancement may be used to achieve the desired brightness level for a reduced electrical drive load of the pixels of the display. A reduction in electrical drive load of the pixels can be used to extend the lifetime of the materials used in the display.

The hereinafter described embodiments of the present invention can provide the following advantages, singly or in combination:

A switchable directional display apparatus using an emissive display can be configured with high optical efficiency;

The apparatus allows efficient switching between a high resolution, high brightness 2D mode and a high brightness 3D mode;

The apparatus allows efficient switching between a standard brightness 2D mode and an enhanced brightness 2D mode, effectively increasing the optical aperture of the display;

The apparatus can be manufactured at low cost;

The optical cross talk of the 3D mode can be optimized;

The use of emissive display allows a thin device to be fabricated without the use of a backlight element;

The elements can be manufactured using known techniques;

The display can operate in a wide range of operating environments.

Embodiments of the present invention will now be described, by way of example only, with reference to the accompanying drawings, in which.

Figure 1:
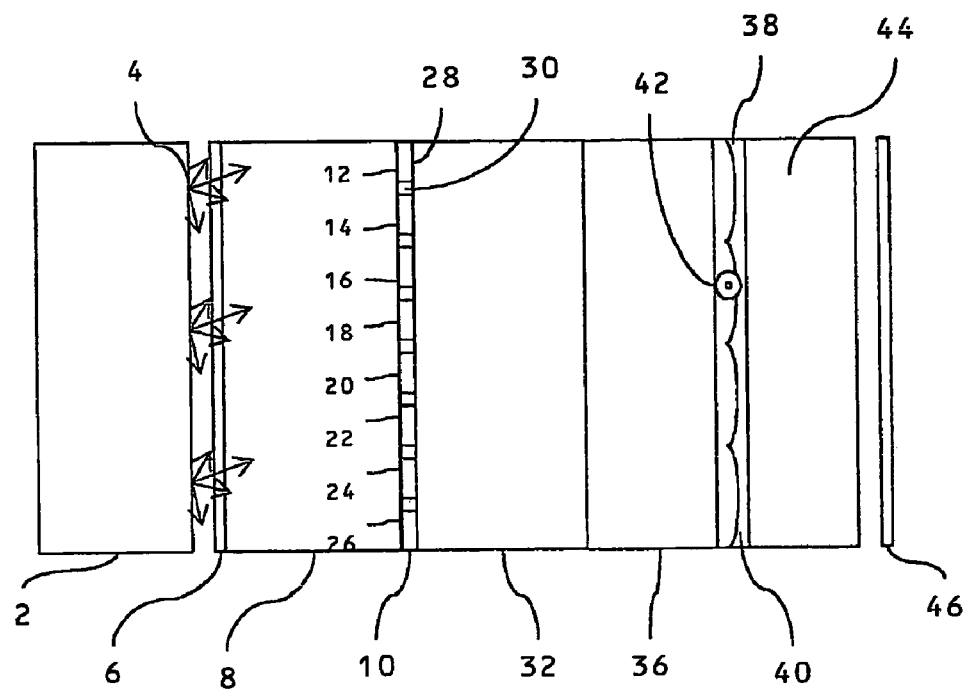
FIG. 1 shows a type of switchable 2D-3D autostereoscopic display apparatus using a liquid crystal display.
Figure 2:
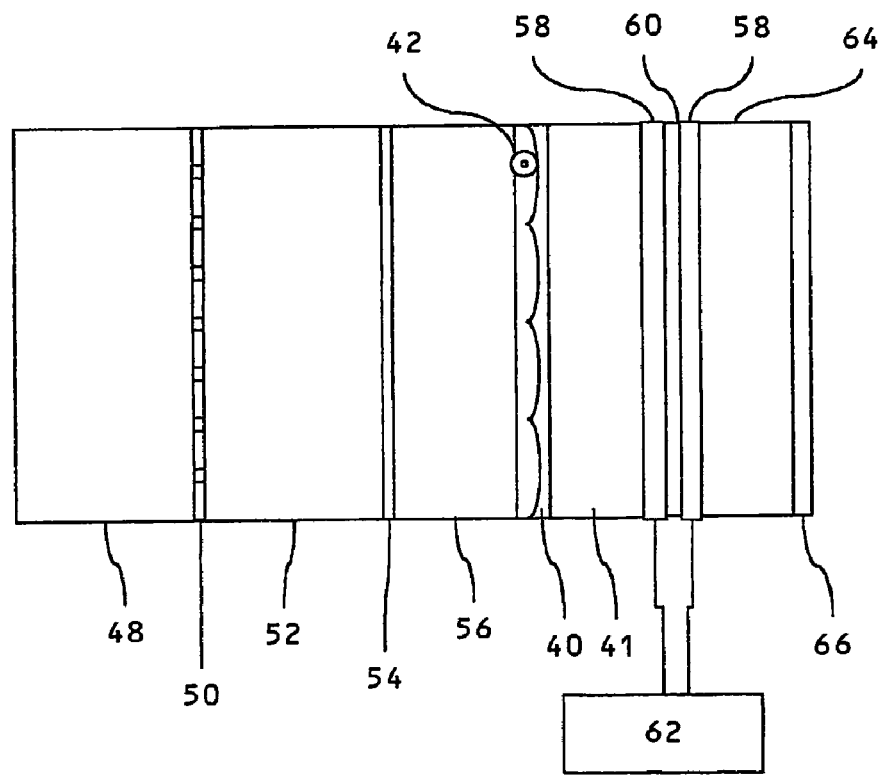
FIG. 2 shows another type of switchable 2D-3D autostereoscopic display apparatus using a polarised emissive display.

FIG. 2 shows a first embodiment of the present invention. An array of pixels 50 is formed on a display substrate 48 to constitute a spatial light modulator. The substrate 48 may comprise an array of addressing thin film transistors and electrodes so that each of the pixels may be independently addressed with an electrical signal. The thin film transistors may be inorganic or may be embodied in organic materials. Alternatively, the pixels may be addressed by a passive addressing scheme in which addressing transistors need not be present at the pixels.

Each of the pixels 50 comprises an emissive region in which the emissive material comprising chromophores is uniaxially aligned so that the polarisation of emission is substantially linear and substantially in the same orientation for the entire pixel. Preferably, each pixel is arranged to have substantially the same polarisation direction.

The emissive material of the pixels 50 may be any organic electroluminescent material, for example a polymer electroluminescent material or a small molecule electroluminescent material. The emissive material may be arranged to produce polarised emission by aligning the molecules of the emitting material using any suitable technique. For example, the emissive material may be that disclosed in "Polarized Electroluminescence from an Anisotropic Nematic Network on a Non-contact Photoalignment Layer", A. E. A. Contoret, S. R. Farrar, P. O. Jackson, S. M. Khan, L. May, M. O'Neill, J. E. Nicholls, S. M. Kelly and G. J. Richards, Adv. Mater. 2000, 12, No. 13, July 5 p 971 which demonstrates that polarisation efficiencies of 11:1 can be achieved in practical systems.

A further cover substrate 52 is attached to the pixels. The substrate 52 may incorporate barrier layers and contrast enhancement black mask layers.

An optional polariser 54 may be attached to the substrate 52. Alternatively, polariser materials may be incorporated at or near to the pixel plane, on the inner surface of the substrate 52 for example.

For an example, one known polarised organic electroluminescent display has a polarisation ratio of 11:1. In combination with a typical polariser of polarisation efficiency 45%, the overall throughput from the light source will be 82.5%, compared to 45% for an unpolarised light source in combination with a clean-up polariser.

An optional substrate 56 is attached to the polariser 54, and has a birefringent microlens formed on its surface. The birefringent microlens incorporates a surface relief structure such as a lenticular surface relief structure. The surface relief structure may be formed at the interface of a birefringent material and an isotropic material. The birefringent microlens incorporates a birefringent material with alignment direction 42, and an isotropic material 40. The birefringent microlens may for example comprise an aligned liquid crystal material such as a nematic liquid crystal sandwiched between homogeneous alignment layers on substrate 56 and on the surface of the isotropic material. Homeotropic alignment layers may also be used. The birefringent material may be UV cured liquid crystal material such as a reactive mesogen liquid crystal. The relative alignment of liquid crystal material on the two surfaces of the birefringent lens may be parallel, anti-parallel, or there may be twist between the two surfaces so that an incident polarisation is rotated in the birefringent lens before encountering the surface relief structure. The refractive index and dispersion of the isotropic material may be substantially the same as one of the refractive indices and dispersion of the birefringent material. Embodiments of birefringent microlenses which are applicable to the present invention are described in WO-03/015,424, which is incorporated herein by reference.

Following the birefringent microlens, a polarisation switch cell is formed on a substrate 41. The switch serves to switch the polarisation transmitted through a final linear output polariser 66 and may comprise a layer of nematic liquid crystal material 60 sandwiched between transparent ITO electrodes and alignment layer 58. In order to switch the output polarisation from the switch cell, a voltage 62 is applied across the liquid crystal cell.

The apparatus of FIG. 2 operates in the following manner. The emissive display produces a substantially linearly polarised output polarisation. The output polarisation from the polarised emissive pixel array 50 is cleaned by the linear polariser 54 which has a transmission direction parallel to the major axis of the polarisation direction of the emissive material. This polarisation state is aligned at 45 degrees to the alignment of the liquid crystal material in the birefringent lens 42, so that it is resolved in to two orthogonal components by the lens. The polarisation switching material 60 in a first state is aligned so that the polarisation state transmitted through the output polariser 66 is parallel to the normal refractive index of the liquid crystal material in the birefringent lens 42. This refractive index is substantially matched to the refractive index of the isotropic material 40, and thus there is substantially no lens effect, although there may be a small residual optical effect to the extent that it is not possible to obtain a precise refractive index match. The display then has a directional distribution which is substantially the same as the optical output from the pixel plane.

In a second mode, the switch 62 adjusts the material 60 so that the transmitted polarisation through the polariser 66 has seen the extraordinary refractive index of the birefringent material 42 and thus there is an index step to the isotropic material at the lens surface, and the lens has an optical function. This causes a change in the directional distribution of the optical output. The lens may be arranged to produce an image of the pixel plane at a window plane.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

The alignment of liquid crystal in the lens may be set to be parallel through the thickness of the cell. The alignment at the lens surface may be parallel to the geometric lens axis of the cylindrical lenses. Alternatively, the birefringent optical axis may be arranged to rotate through the cell so that the polarisation alignment direction of the emissive display and clean up polariser are at an angle different to the geometric lens axis. This may be advantageous for example to relax manufacturing tolerances in fabrication of the polarised emission devices, or to improve the viewing angle of the devices if there are restrictions placed on viewing angle by the polarised emission conditions.

The lenses may be arranged in columns with a pitch substantially (but not exactly) twice the pitch of the columns of pixels of the display. If a user places their eyes in the window plane, alternate columns of pixels of the panel may be seen, and a stereo image may be observed. This optical output is described in WO-03/15424.

Alternatively, the lens can be arranged as rows of cylindrical lenses with a pitch substantially the same (but not exactly) as the pitch of the rows of the display. If the aperture ratio of the pixels is less than 100% in the vertical direction, then in the directional mode of operation, the lenses will produce regions from which the display will have a higher brightness separated by regions of lower brightness due to the focusing of the lenses from the centre of the pixels.

The apparatus of FIG. 2 has a nominal 50% brightness because the input polarisation state to the lenses is resolved in to two orthogonal components respectively parallel and orthogonal to the birefringent optical axis of the birefringent microlenses.

Figure 3:
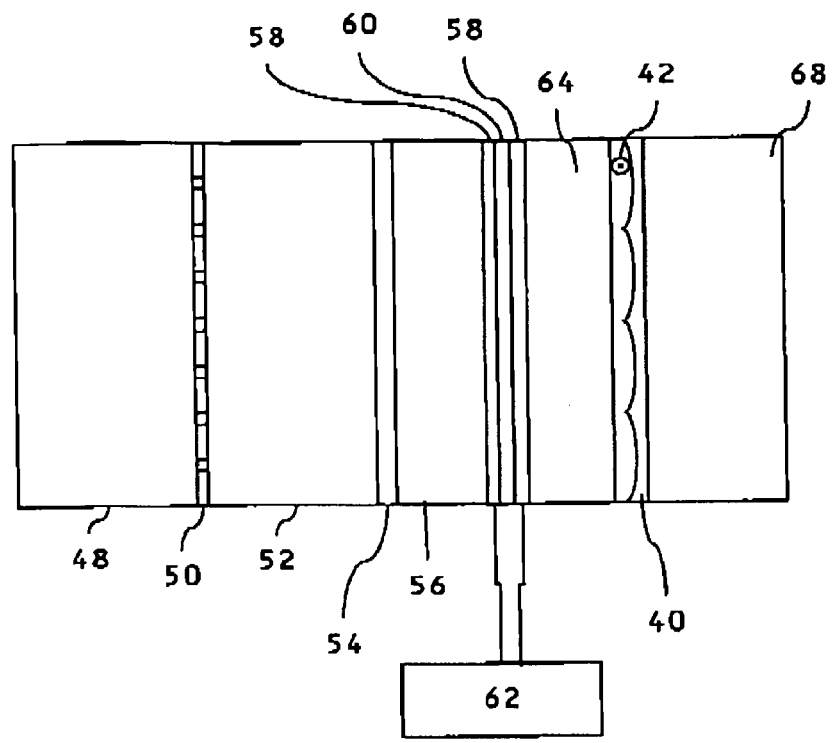
FIG. 3 shows the another type of switchable 2D-3D autostereoscopic display apparatus using a polarised emissive display.

An apparatus which can show a full brightness mode of operation is illustrated in FIG. 3. Compared to FIG. 2, the position of the polarisation switch and birefringent microlens array have been reversed. The output polarisation from the polarised emissive display and clean-up polariser 54 is incident on the polarisation switching mechanism 60,58,62. In a first mode, no polarisation switch takes place so that the polarisation incident on the birefringent microlens array 42 is parallel to the ordinary component of the refractive index at the lens surface, and substantially no lens is seen because of the index match to the isotropic material 40. The light passes through a final substrate 68 which may comprise for example anti-reflection films. Thus the light has substantially the same directional distribution as the emissive panel.

In the second mode of operation, the polarisation switch rotates the polarisation from the panel so that it is parallel to the birefringent optical axis of the birefringent microlens, and the lens has an optical function.

In this configuration, all of the light sees the correct lens axis and thus there are substantially no losses in the system.

Figure 4:
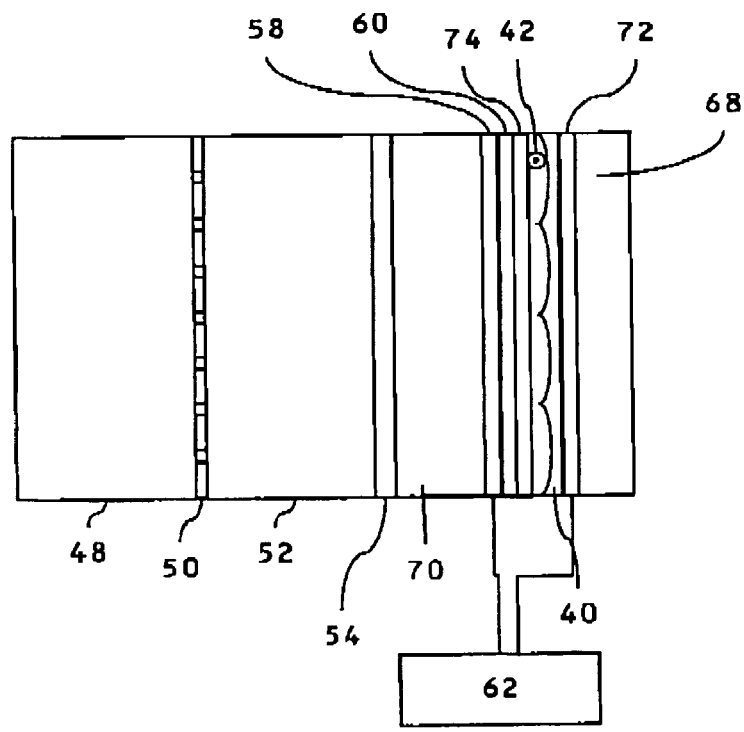
FIG. 4 shows another type of switchable 2D-3D autostereoscopic display apparatus using a polarised emissive display.

Such a configuration has an increased viewing distance because of the thickness of the additional layers. The thickness can be reduced by removing the substrate 64 and using cured liquid crystal material for the birefringent lens, as shown in FIG. 4. An optional substrate 70 is formed on the polariser 54 and has ITO and alignment layers 58 formed on its opposite surface. The birefringent microlens and isotropic material may be formed on a substrate 68 with an ITO coating 72. The birefringent microlens array 42 may be made from a UV cured material, such as a reactive mesogen, and an alignment layer 74 may be formed on its surface. A switchable polarisation modulating material such as a nematic liquid crystal 60 may be sandwiched between the microlens alignment layer 42 and the ITO and alignment layer 58. Alternatively, the ITO coating 72 may be formed on the UV cured birefringent microlens 42 surface in combination with the alignment layer 74. A voltage is applied to the ITO coatings by an electrical source 62.

In this manner, the separation of the lens from the pixel plane may be reduced. This is particularly advantageous for devices with small pixel sizes. The substrate 70 may also be removed, so that the layers 58 are formed on the polariser 54 for example.

Figure 5:
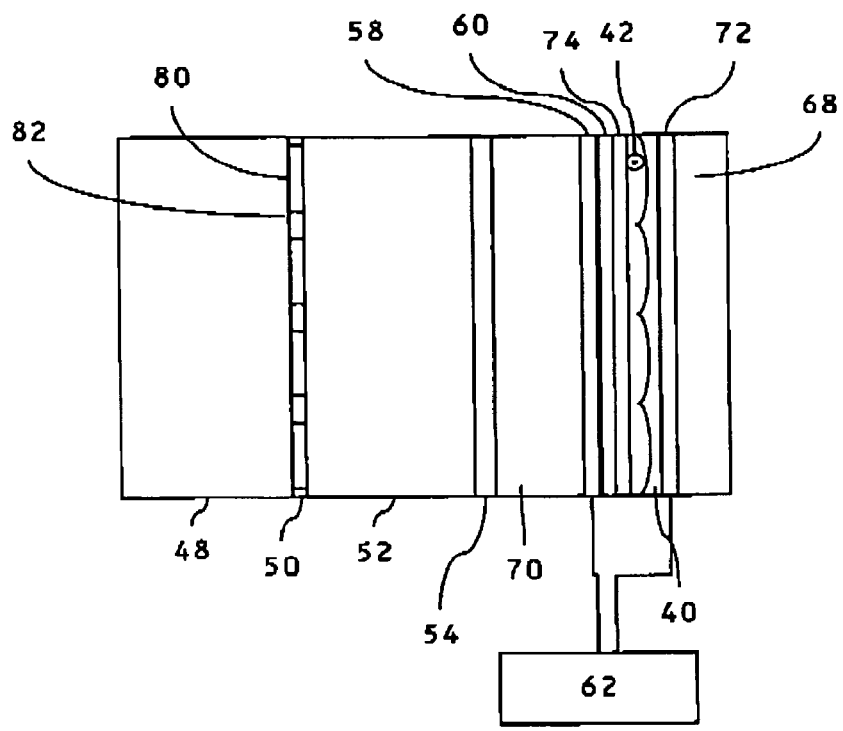
FIG. 5 shows a type of switchable brightness enhanced display apparatus using a polarised emissive display.

FIG. 5 shows a switchable enhanced brightness display apparatus using a polarised emissive display;

As shown in FIG. 5, the polarised emissive pixels in a pixel plane 50 may comprise emissive regions 80 and gaps 82 between the emissive pixels. The gap regions may comprise electrodes or addressing transistors for example. The lenses may be positioned in rows with respect to the display. And the pitch of the lenses is set to be substantially the same as the pitch of the rows of the pixels. The remainder of the elements of the display may be configured and operate as in FIG. 4 for example. In a first mode of operation, the lens is configured to have no optical function so that the light from the emissive region is substantially unmodified by the lenses of the cylindrical lens array. In a second mode of operation the lenses are configured to have an optical function so that each of the pixels is imaged by a respective lens to a window plane at a nominal distance from the display. If an observer places their eye at the image of the pixels at the window plane then the display will have an increased brightness compared to the unmodified display. If the observer places their eye at the gap between the images, then the display will have a reduced brightness than the modified display. In this manner, the display brightness can advantageously be improved in cases where the aperture ratio of the pixel is less than 100% in a first direction.

Further embodiments of the first aspect of the present invention may be formed as the display apparatuses disclosed in WO-03/015424, which is incorporated herein by reference, but replacing the spatial light modulators disclosed therein by an emissive spatial light modulator comprising an array of pixels of organic electroluminescent material each arranged to output substantially polarised light, as described above. Therefore the disclosure of WO-03/015424 applies equally to the present invention except for the replacement of the spatial light modulator.

Figure 6:
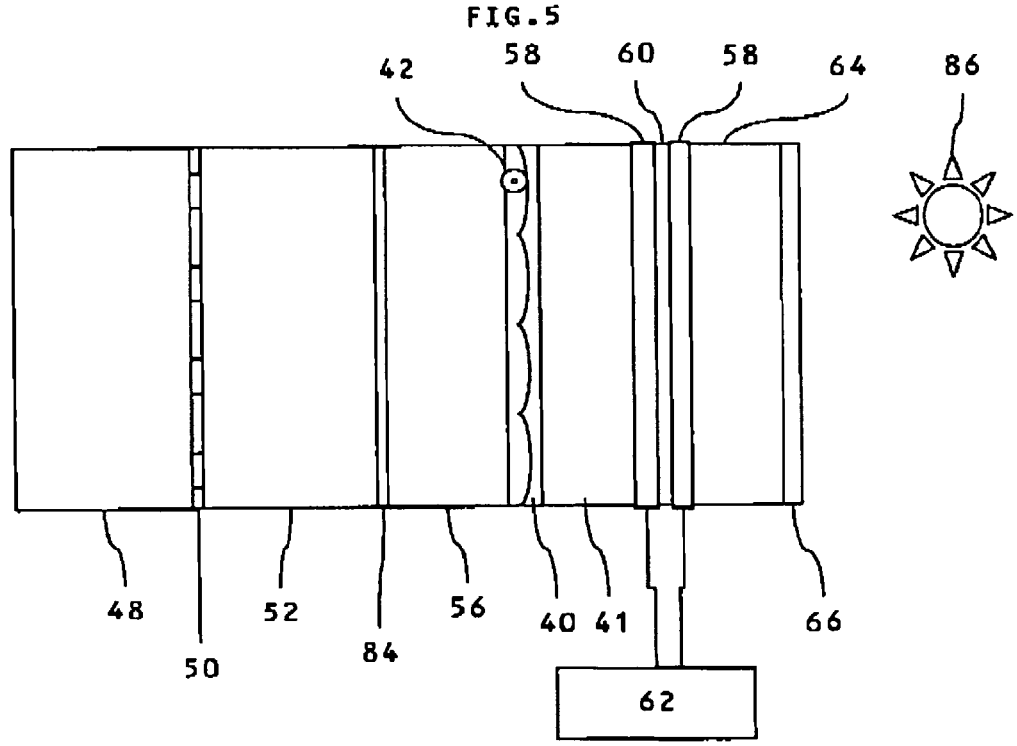
FIG. 6 shows an apparatus comprising a quarter waveplate to cancel frontal reflections from electrodes in a randomly polarised emissive OEL display.

FIG. 6 shows in cross section a brightness enhancement display apparatus having an unpolarised display.

The display apparatus comprises an array of pixels 50 formed on a display substrate 48 to constitute a spatial light modulator having the same construction and arrangement as in the emissive display apparatuses described above except that they output substantially randomly polarised light. Thus, the emissive material of the pixels 50 may be any organic electroluminescent material, for example a polymer electroluminescent material or a small molecule electroluminescent material. Alternatively, the array of pixels 50 and substrate 48 may be replaced by any other type of emissive spatial light modulator comprising an array of pixels each arranged to output randomly polarised light The array of pixels 50 has a vertical aperture ratio less than 100% and emits light towards a quarter waveplate 84. As the light is substantially randomly polarised, first and second resolved linear components of substantially equal intensity are incident on to the lens array 42. The first resolved linear polarisation component parallel to the optical axis of the birefringent material sees a phase step at the lens surface, and so the light from a pixel aperture is directed towards a window at the nominal viewing position. The resolved component orthogonal to the birefringent material optical axis sees an index match at the refractive surface, and so substantially no lens function is produced. The light is then passed through the switchable polarisation rotator 58-62. In the off state, the first resolved linear polarisation state is rotated and extinguished by the output polariser 66, whereas the second resolved linear polarisation state is rotated and transmitted through the output polariser 66. When an electric field is applied to the layer 60, the states are unrotated so the first polarisation state is transmitted and the second state is absorbed. Thus the display operates in the conventional mode.

In the first mode of operation, light incident from an external light source 86 in front of the display is polarized by the polarizer 66, and rotated by the rotator 58-62 so that no phase step is seen at the lens 42, 40. The light then passes through the waveplate 84 where it is converted to a circular polarization state FIG. 9 shows in more detail the alignment of the optical axis of the quarter waveplate in cooperation with the alignment of optical axis of the birefringent lens. For simplicity of operation, the optical path for light from an external light source 86 is unfolded, and is shown for the directional mode of the apparatus of FIG. 6. The incident light from the light 20, source 86 has polarization direction 93 from the polarizer 66 with polarization transmission direction 92. The light passes through the polarization switch (not shown) such that the polarization state 94 passes through the substrate 41. The polarization state 97 is incident on the birefringent optical axis 96 of the birefringent lens 42. In this example, the alignment of the birefringent lens is anti-parallel so that the alignment direction 98 at the substrate 56 is produced and the polarization direction in substrate 56 is produced. The optical axis direction 100 of the quarter waveplate 84 is set 45 degrees to the direction 98, being the alignment of the birefringent material in the birefringent lens on the surface closest to the quarter waveplate. The quarter waveplate produces a substantially circular polarization state. The light reflects from the pixel plane 50 with circular polarization state 102, and sees the quarter waveplate axis 100 to give a polarization state output 104. The quarter waveplate thus serves to output a polarization state which is at 90 degrees to the direction on the reflected path. This polarization states 106, 108 are orthogonal to the birefringent optical axis direction 96, 98 at the lens. At the polarization switch, the polarization state is unrotated so the polarization sate 110 passes through the substrate 64 and is incident on the polarizer 66 where it is substantially absorbed.

At reflection from the electrodes in the pixel plane 50, a phase shift occurs. The light then passes back through the waveplate 84 to produce a linear polarisation orthogonal to the input, so that a phase step is seen at the lens surface. The polarisation state is again rotated by the rotator 58-62 and extinguished by the input polariser 66. In the switched state, the same phase shift occurs at the reflector, so the reflections are again cancelled by the quarter waveplate and polariser combination. Thus the frontal reflections from the reflectors are cancelled, while maintaining the switching brightness enhancement or autostereoscopic display function.

Such an external polariser embodiment has the advantage that the visibility of the lenses in external ambient light is reduced. External light sources incident on the front of the display pass through the input polariser, undergo Fresnel reflections at the lens and other surfaces with phase steps, (for example from reflective coatings such as ITO) and then pass back through the output polariser. Therefore, the external polariser absorbs a proportion of the light passing in each direction, and thus reduces lens reflections, which advantageously increases display contrast.

The viewing freedom of the display in enhanced brightness mode, or the nominal viewing distance in 3D mode is determined by the separation of the pixel and lens planes. It is desirable to minimize the thickness of the added layers between these two surface. The quarter waveplate 84 can be a thin waveplate such as a coated, aligned curable liquid crystal layer. One example of such a material is RM257 available from Merck Ltd. which can be UV cured after alignment on a suitable alignment layer. A typical thickness would be less than two microns for this layer. Multiple layers can increase the spectral efficacy of the quarter waveplate as well known in the art.

The substrate 56 may be for example a thin glass Microsheet (Schott A.G.), or may be eliminated by the use of a cured liquid crystal material in the lens 42. To ensure structural stability of the encapsulation layer counter substrate 52, the OEL device may be assembled with the lenses in place.

Such an assembly process is described in FIG. 7. A substrate 41 with an ITO layer 58 on one side has an isotropic lens structure 40 formed by known means such a UV casting or embossing on the second surface. The surface may be coated by an alignment layer such as polyimide, or may have a diffractive alignment layer structure formed on it. The diffractive layer structure may be formed in the mastering tool for embossing the surface relief structure so that a single embossing step is required.

Figure 7A:
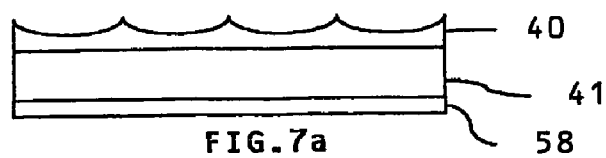
FIGS. 7a to 7f show a process for OEL panel construction to allow a short viewing distance while maintaining structural stability.
Figure 7B:
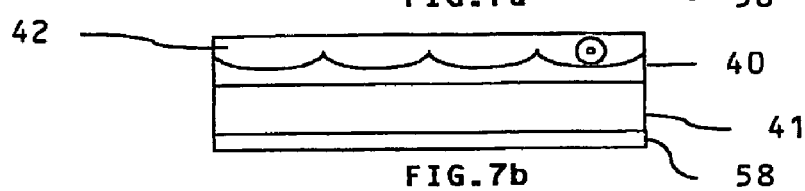

FIG. 7*b* shows a curable liquid crystal material layer 42 formed on the surface of the lenses 40. The alignment of the lens surface is fixed by the alignment layer on the isotropic lens. The alignment of the opposite surface may be fixed by an alignment layer on a second substrate (not shown), by a diffractive structure on a plane shim, or may be the relaxed alignment state of the liquid crystal material (i.e. no alignment fixed in the material). If a second substrate is used, it may be removed after solidification of the lens so as to reduce the overall thickness of the device.

Figure 7C:
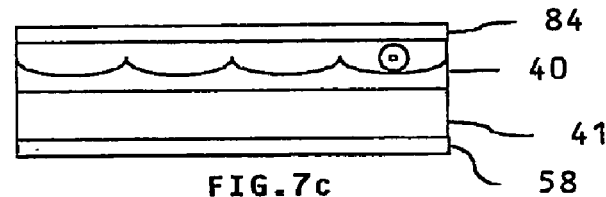

FIG. 7*c* shows the attachment of the waveplate. This may be a coated waveplate such as a curable liquid crystal polymer, or may be a laminated layer. Alternatively, this layer may be attached to the display counter substrate 52.

Figure 7D:
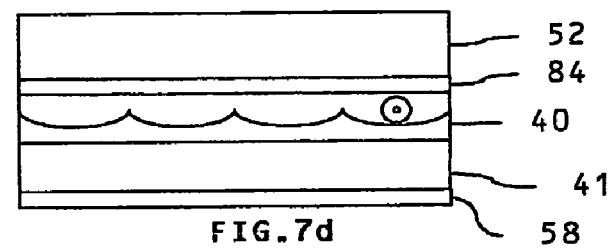
Figure 7E:
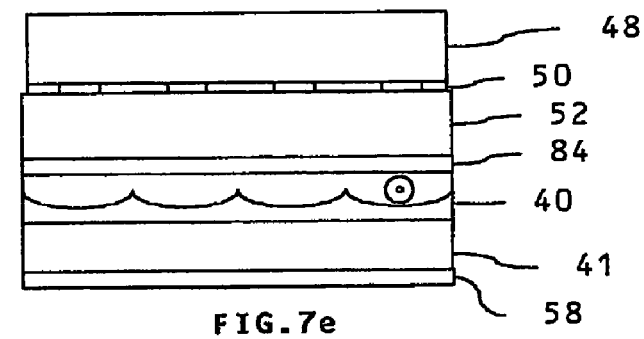

FIG. 7*d* shows the attachment to the display counter substrate 52. The composite counter substrate is then attached to OEL emissive substrate to provide encapsulation as shown in FIG. 7*e*. In the case where colour filters are fitted to the counter substrate, these may be applied to the plane glass 52 or to the assembled composite substrate.

Figure 7F:
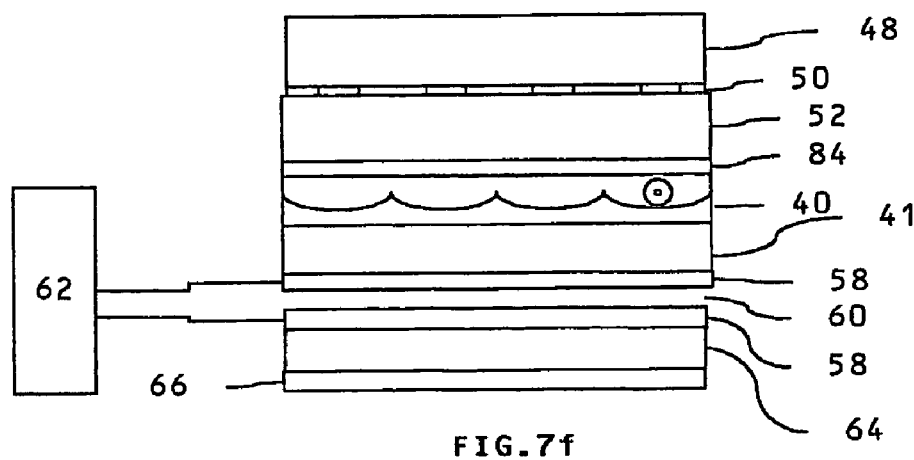

FIG. 7*f* shows the final fitting of the switch cell to the assembled device.

Figure 8:
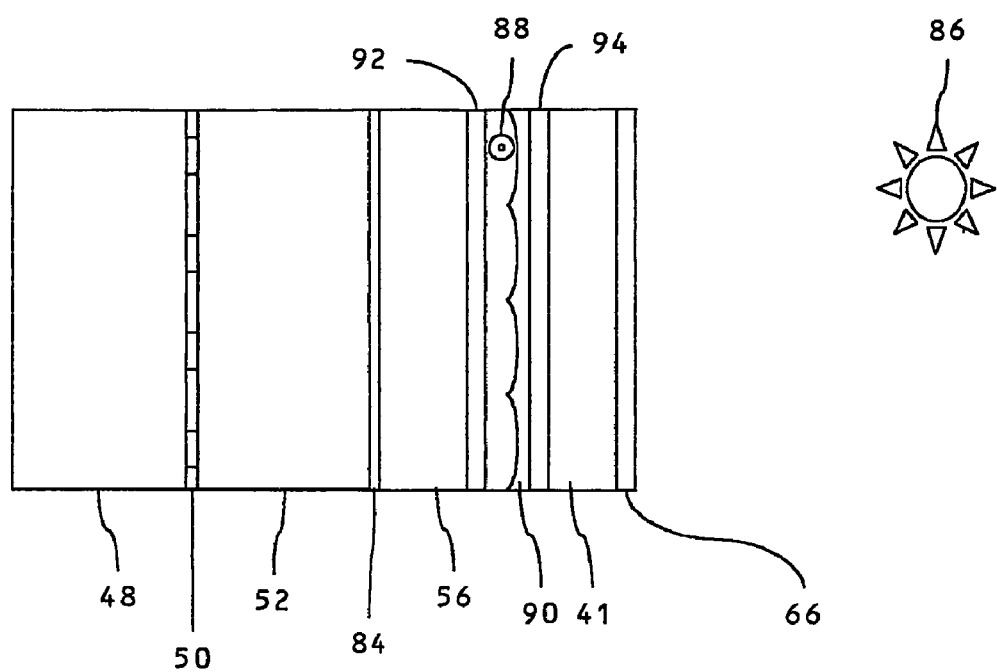
FIG. 8 shows a display incorporating an active birefringent lens and quarter waveplate; and The various embodiments hereinafter described share a number of common features. For brevity, in respect of the common features common reference numerals will be used and a description thereof will not be repeated for each embodiment.

In a further embodiment of the invention, the polarisation rotator and passive birefringent lens can be replaced by an active lens as shown in cross section in FIG. 8. The emissive pixel plane 50 directs light through the quarter waveplate 84 and on to an active lens comprising transparent electrodes 92,94 and liquid crystal layer 88. A surface relief lens 90 has a refractive index substantially equal to the ordinary refractive index of the liquid crystal 88. In a first mode, no field is applied to the cell, and the lens is aligned so that there is a phase step at the lens surface, giving a lens function. The lens is arranged to produce the viewing windows. In a second mode, a field is applied between the electrodes 92,94 so that the liquid crystal material 88 realigns, and an index match takes place at the lens surface. Light incident from an ambient light source sees a cancellation function due to the combination of the quarter waveplate 84 and polariser 66, as described previously.

The invention claimed is:

1. A display apparatus comprising:
   an emissive spatial light modulator comprising an array of pixels each arranged to output substantially randomly polarized light;
   a birefringent lens positioned to receive light from the spatial light modulator arranged to direct light of a first polarization component into a first directional distribution and to direct light of a second polarization component into a second directional distribution different from the first directional distribution;
   a quarter waveplate; and
   a linear polarizer,
   wherein the quarter waveplate is arranged between the spatial light modulator and the birefringent lens and the linear polarizer is arranged on the opposite side of the birefringent lens from the quarter waveplate.

2. A display apparatus according to claim 1,
   wherein the birefringent lens is a passive birefringent lens arranged to direct light of a first polarization component into said first directional distribution and to direct light of a second polarization component into said second directional distribution, and
   the display apparatus further comprises a switchable polarization rotator arranged between the birefringent lens and the linear polarizer, the switchable polarization rotator being switchable between a first mode in which incident light of said first polarization component is output with a polarization allowing it to be passed by the linear polarizer and a second mode in which incident light of said second polarization component is output with a polarization allowing it to be passed by the linear polarizer.

3. A display apparatus according to claim 1, wherein the birefringent lens is an active birefringent lens switchable between a first mode of operation in which light having a polarization allowing it to be passed by the linear polarizer is directed into said first directional distribution and a second mode of operation in which light having a said polarization allowing it to be passed by the linear polarizer is directed into said second directional distribution.

4. A display apparatus according to claim 1, wherein said pixels of the spatial light modulator contain an organic electroluminescent material.

5. A display apparatus according to claim 1, wherein the optical axis of the waveplate is aligned at substantially 45 degrees to the alignment of the birefringent optical axis of the birefringent material of the lens at the surface of the lens closest the waveplate.

6. A display apparatus according to claim 1, wherein the second directional distribution is the same as the input distribution, whereby the birefringent lens has substantially no optical effect.

* * * * *